(12) United States Patent
Koerwien

(10) Patent No.: US 8,357,325 B2
(45) Date of Patent: Jan. 22, 2013

(54) MOULDS WITH INTEGRATED HEATING AND METHODS OF MAKING THE SAME

(75) Inventor: Thomas Koerwien, Hoehenkirchen-Siegertsbrunn (DE)

(73) Assignee: General Electric Company, Niskayuna, NY (US)

( * ) Notice: Subject to any disclaimer, the term of this patent is extended or adjusted under 35 U.S.C. 154(b) by 506 days.

(21) Appl. No.: 12/331,500

(22) Filed: Dec. 10, 2008

(65) Prior Publication Data

US 2010/0140448 A1 Jun. 10, 2010

(51) Int. Cl.
*B29C 33/02* (2006.01)

(52) U.S. Cl. .......................... 264/404; 264/402; 264/219

(58) Field of Classification Search .................. 264/219, 264/220, 221, 222, 223, 224, 225, 226, 227, 264/402, 404

See application file for complete search history.

(56) References Cited

U.S. PATENT DOCUMENTS

| | | | |
|---|---|---|---|
| 3,387,333 A | | 6/1968 | Irvine et al. |
| 4,385,957 A | * | 5/1983 | Wackerle et al. ............. 264/105 |
| 5,648,137 A | * | 7/1997 | Blackmore .................... 428/102 |
| 5,656,231 A | * | 8/1997 | Blackmore .................... 264/404 |
| 6,146,576 A | * | 11/2000 | Blackmore .................... 264/404 |
| 6,501,056 B1 | | 12/2002 | Hirohata et al. |
| 7,223,091 B2 | | 5/2007 | Olsen et al. |
| 2003/0091679 A1 | | 5/2003 | Aramburu et al. |
| 2006/0246276 A1 | | 11/2006 | Chung |
| 2010/0062099 A1 | | 3/2010 | Funke et al. |

FOREIGN PATENT DOCUMENTS

| | | |
|---|---|---|
| DE | 102006058198 A1 | 6/2008 |
| EP | 1316400 B1 | 2/2007 |
| EP | 1990178 A1 | 11/2008 |
| GB | 762462 A | 11/1956 |
| JP | 60044328 A * | 3/1985 |
| JP | 02088204 A * | 3/1990 |
| JP | 05330482 A * | 12/1993 |
| JP | 96032417 B2 * | 3/1996 |
| WO | 200054949 A2 | 9/2000 |
| WO | WO0071329 A1 | 11/2000 |
| WO | WO2005092586 A1 | 10/2005 |
| WO | WO2006082479 A1 | 8/2006 |
| WO | 2010040576 A1 | 4/2010 |

OTHER PUBLICATIONS

Tong et al, 3D Fibre Reinforced Polymer Composites, Elsevier, 2002, pp. 22-40.*

(Continued)

*Primary Examiner* — Joseph Del Sole
*Assistant Examiner* — Timothy Kennedy
(74) *Attorney, Agent, or Firm* — Paul J. DiConza

(57) ABSTRACT

The present invention provides a method of fabricating a mold and the mold fabricated by such method. The mold is fabricated by providing a support structure having a predefined shape; applying a heat distribution layer on the support structure; applying a heating element network upon the heat distribution layer; applying at least one glass composition layer upon the heating element network; applying a resin composition to each of the heating element network and the at least one glass composition layer; and integrating the heat distribution layer, heating element network, the at least one glass composition layer and the resin composition to form a mold unit.

21 Claims, 3 Drawing Sheets

OTHER PUBLICATIONS

English machine translation of JP 05330482, retrieved Dec. 13, 2010 from JPO database.*
English abstract of JP 02088204, 1990.*
English abstract of JP 60044328, 1985.*
English machine translation of JP 08-032417 B (equiv. to JP 96032417), retrieved from JPO database May 30, 2012.*
http://www.cotronics.com/vo/cotr/pdf/700ins.pdf (Undated).*
David Mangelsdorf; Carbon fibres for Electrically Heated System; Non Patent Literature Item—Report Documentation Page: Report No. 75-120-CEMEL; Report Date: May, 1975; 23 pages.
Smart moulds for cost effective components; Reinforced Plastics; vol. 47, Issue 10, Nov. 2003, Retrieved from the Internet: <URL: http://www.sciencedirect.com/science>; pp. 30-34.
Mould tool heating—the oven-free alternative; Reinforced Plastics; vol. 47, Issue 11, Dec. 2003, Retrieved from the Internet <URL: http://www.sciencedirect.com/science>; pp. 38-41.
Anonymous: "Standard insulated heating tape", Internet Citation, pp. 1-3, Nov. 1, 2006.
Search Report and Written Opinion from Corresponding EP Application No. 09177288.9 received on Jan. 31, 2011.

* cited by examiner

MOULDS WITH INTEGRATED HEATING AND METHODS OF MAKING THE SAME

BACKGROUND

The present invention relates generally to wind turbine blade moulds and particularly to the preparation method of glass reinforced, thermal expansion tolerable, electrically heated moulds.

In recent years, concern about global warming and the harmful effects of fuel emissions has created new demand for cleaner and sustainable energy sources, like wind. Wind turbines have received increased attention as an environmentally safe and relatively inexpensive alternative energy source. With this growing interest, considerable efforts have been made to develop wind turbines that are reliable and efficient.

Wind turbines harness the kinetic energy of wind and transform this kinetic energy into electrical energy. Thus, electrical power can be generated in an almost pollution free manner. To generate electrical power, wind turbines generally include a rotor that supports a number of blades extending radially therefrom. These blades capture the kinetic energy of the wind and, in turn, cause rotational motion of a drive shaft and a rotor of a generator. The amount of energy produced by such wind power generation systems is dependent on the ability of the wind turbine to capture wind and in turn depends on the physical and structural parameters of the rotor blades.

It is generally desirable to maintain good quality control standards over wind turbine blade design and manufacturing. Every rotor blade is a mirror image of the mould in which it is cast. The technology behind designing and building these moulds is therefore crucial for the quality of the finished blades. Once cast, the blade profile must be according to the dimension and quality specifications and have extremely limited variation between successive castings. Additionally, there are also stringent requirements about the process, including a rapid throughput time during casting.

To improve efficiency and speed in production of the rotor blades, greater control is required over the moulding process itself. The moulds need to be fitted with the heating feature to cure the components of the rotor blades, particularly the epoxy resins. The cure rate of the epoxy resins used in the blade manufacture is highly dependent upon temperature. The temperature of curing the resins can be up to about 130° C. Another benefit of heating moulds is the ability to post cure the epoxy resin system. Post curing is a process whereby a cured product is held at an elevated temperature for some time to improve the mechanical properties of the product by relieving stress. One exemplary post curing process is held at temperatures of about 65° C. to about 70° C. for a duration up to about 12 hours. The temperature should be controllable within the error of about ±3° C.

Therefore there is a need for a mould and a method of fabricating a mould that provides a robust heating solution without degrading the efficiency or the durability of the mould itself while enabling the desired repeatability and reproducibility of high quality moulded products, such as the wind blades discussed above.

SUMMARY OF INVENTION

In general, the present invention provides a rotor blade mould and a method of fabrication of the mould with an integrated heating and tolerable thermal expansion with other parts of the mould.

One aspect of the invention is a method of fabricating a mould. The mould is fabricated by providing a support structure having a predefined shape; applying a heat distribution layer on the support structure; applying a heating element network upon the heat distribution layer; applying at least one glass composition layer upon said heating element network; applying a resin composition to each of the heating element network and the at least one glass composition layer; and integrating the heat distribution layer, heating element network, the at least one glass composition layer and the resin composition to form a mould unit.

Another aspect of the invention is a mould body. The mould body comprises a heat distribution layer; at least one heating element network layer; at least one glass composition layer disposed on the at least one heating element network layer, wherein the at least one heating element network and the at least one glass composition layers are encapsulated by a cured resin.

Yet another aspect of the invention is a method of fabricating a mould. The mould is fabricated by providing a support structure having a predefined shape; applying the support structure with a heat distribution layer; at least one carbon fabric layer; applying at least one glass fiber layer upon the at least one carbon fabric layer; applying a resin to each of the at least one carbon fabric layer and the at least one glass fiber layer; and integrating the heat distribution layer, carbon fabric, glass fiber layer and the resin to form a mould unit.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include the methods of making a rotor blade mould and the mould itself.

The mould of the present invention can be for a complete blade or for some portion of a respective blade, or alternatively for products required similar constructs or surface characteristics as a wind turbine blade such as yachts or the like. Accordingly, the moulds can be of different shapes, sizes and can have different mechanisms and multiple parts depending on the blades or portion of the blades that are manufactured using these moulds. As a result, the finer details of forming the moulds and the components of the moulds will vary. Only certain features and processes are described in this document that are necessary for understanding the present invention.

Figure 1:
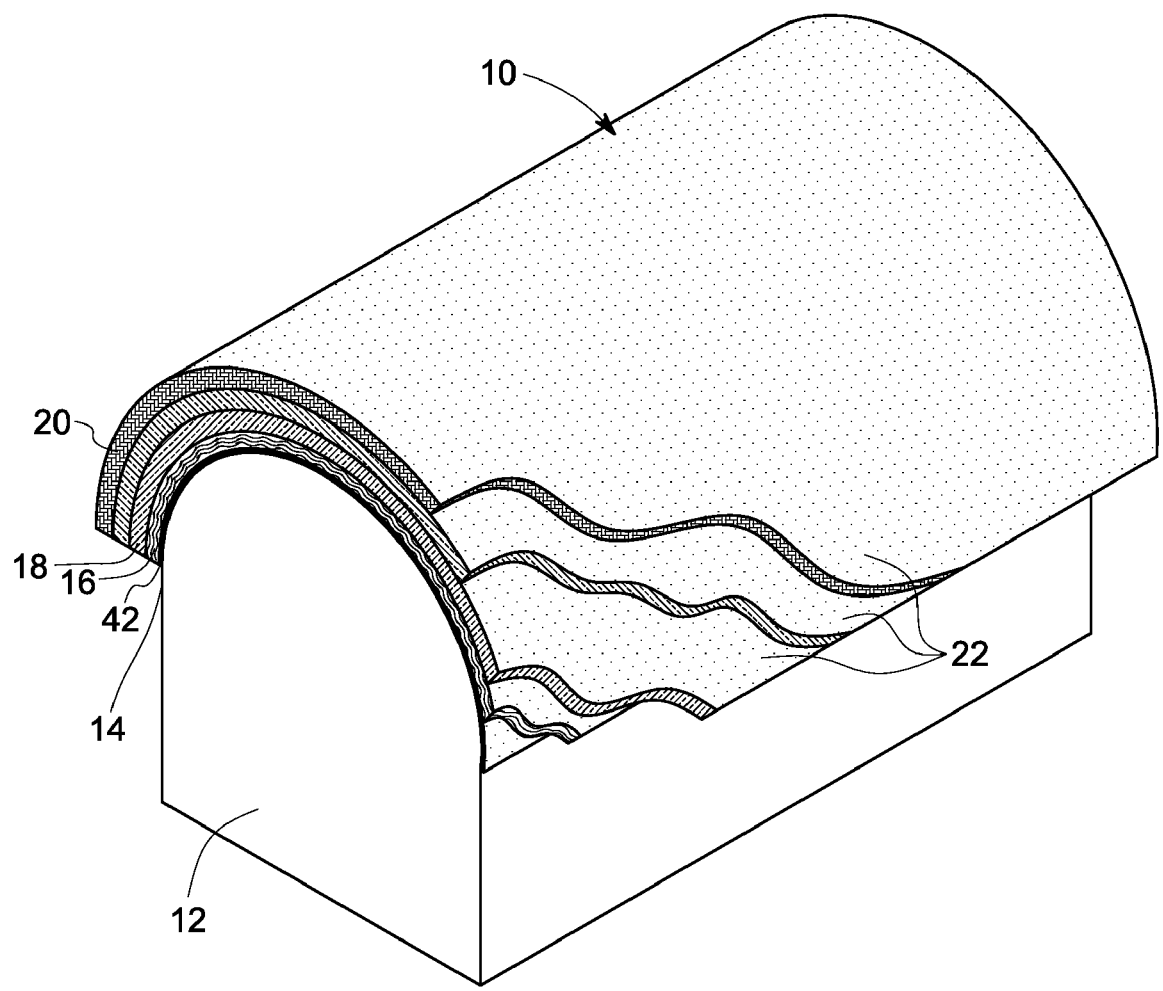
FIG. 1 is a section view of a mould under preparation according to one embodiment of the present invention.

FIG. 1 is a schematic of a mould 10 build-up according to one embodiment of the present invention. Building a new blade mould 10 begins by designing a support structure 12, comprising a plug (a full-scale model with the exact external shape of the blade or the blade part required). The plug acts as a negative mould for the manufacturing of a respective rotor blade mould. The support structure 12 can be of any material such as a metal, alloy, epoxy, wood, any composite, or any combinations thereof. The support structure 12 is produced such that the plug surface 14 adjacent to the mould 10 has appropriate surface features to ensure that the mould 10 will also have a appropriate inner surface 40 (FIG. 2) qualities, often a smooth surface, when detached from the support structure 12, which in turn determines the surface quality of the blades subsequently cast while using the mould 10.

A heating element network 16 is disposed upon the surface 14 of the plug of support structure 12. In one embodiment of the present invention the heating element network 16 comprises carbon. Even heating on the mould surface 40 (FIG. 2) is required without significant variation and should be fully protected from overheating. In order to achieve even temperatures across the mould inner surface 40, a heat distribution layer 42 is typically disposed the plug surface 14, thereby covering the surface of the heating element network 16 from the mould surface 40. The heat distribution layer 42 provides appropriate heat dissipation by diffusing the heat directed from the heating element network 16 thereby preventing the localized heating (unless desirable) of the blade parts when they are cast. The heat distribution layer 42 also serves as a protective layer for the heating element network 16 by preventing the exposure of heating element network 16 to the environment and any other possible direct mechanical cracks or fractures. The heat-distribution layer 42 can be a thin layer of glass fiber, a mixture of glass composition and the resin, or any combination of these. In one embodiment the heat-distribution layer can be disposed on the surface 14 (FIG. 1) of the plug of the support structure 12 before applying the heating element network 16. In another embodiment the heat distribution layer 42 is disposed on the surface 40 of the mould after removal of the mould from the plug. In one particular embodiment the heat distribution layer is applied in the form of glass painting.

The heating element network 16 can be provided in different shapes such as long fibers, a woven fabric (FIG. 3), a braided network (FIG. 4), a knitted network (FIG. 5), or any combination of these. While the various heating element materials provide unique structural and electrical properties, the forms such as woven, braided or knitted networks have more interconnectivity and do not become inoperative as a result of a local failure.

Upon the heating element network 16 (FIG. 1) at least one glass composition layer 18 is disposed. The glass composition is the major part of the mould body and is applied in the form of layers or laminates. The glass composition provides strength and rigidity to the mould body and also ensures the oxygen free atmosphere to the heating element network 16. The glass composition layers 18 are also the major load bearing parts of the mould body. The glass composition layers 18 can be in the form of fibers, a group of fibers, fabrics, laminates, or braids or any combination of these.

A resin composition 22 is applied on the glass composition layers 18. The resin composition infiltrates through the glass composition layer(s) 18, and the heating element network 16 to form encapsulated mould body 10. The resin 22 can be initially applied in viscous form and consequently cured to become a hard layer. In one embodiment the resin 22 is cured by the application of heat. In one particular embodiment the heat supplied through the heating element network 16 cures the resin 22. In one embodiment a heat-reflecting layer 20 is also used near the outer surface of the mould 10 so that the thermal management and thermal efficiency of the mould is increased. The heat-reflecting layer 20 reflects heat back into the mould body and thereby increases the heat efficiency of the mould 10.

Figure 2:
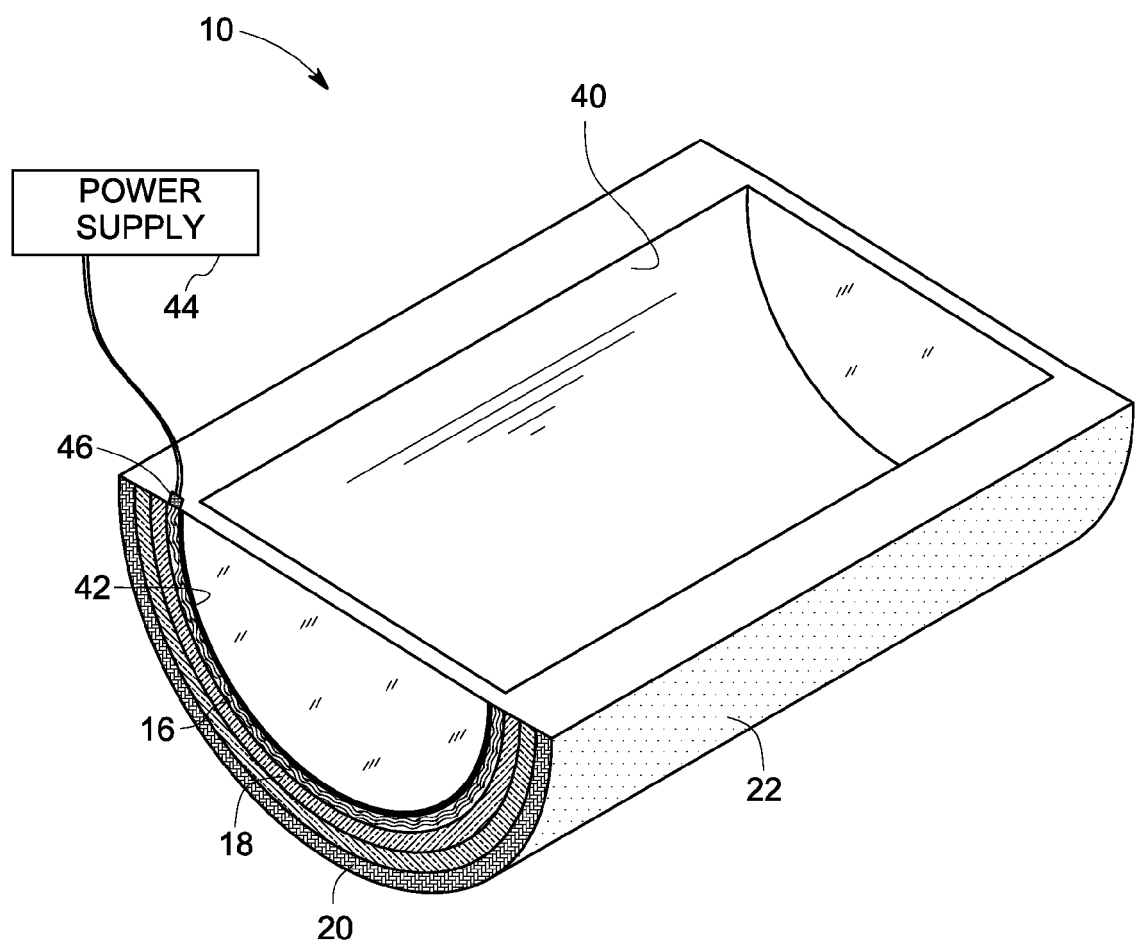
FIG. 2 is a top view of a part of the completed mould according to one embodiment of the present invention.

The mould 10 with the integrated heat distribution layer 42, heating element network 16, glass composition layer 18, heat-reflecting layer 20, and the resin composition 22 is then detached from the support structure 12 without affecting the mould's surface properties. The detachment can be achieved by mechanically turning the mould upside down at certain temperature. In one embodiment the mould after removing from the plug has a very smooth surface 40 (FIG. 2). In another embodiment the mould inner surface is given a smooth finish by applying a coating of a suitable material, such as a glass or resin.

The heating element network 16 (FIG. 2) heats up by resistive heating when provided with electricity from the electric power supply 44. The heating element network 16 can be connected to the power supply 44 by any suitable manner, including for example, by attaching suitable metal or alloy wires 46 by welding or brazing. The material of the weld or braze is not limited and may be any of conventional metal or alloy materials. Examples of suitable materials include copper, silver, molybdenum, tungsten and the like metals and their alloys. In one embodiment the attachment of the metal or alloy wires 46 to the heating element network 16 is conducted prior to the application of the heating element network 16 on the support structure 12.

In the mould 10 (FIG. 2), the heat distribution layer 42, the heating element network 16, glass composition 18 and the resin composition 22 are in contact with each other and perform together at the time of casting, curing and post-curing of the rotor blades. Therefore it is very important to have the physical and chemical compatibility between these components at all stages of the blade (or product) manufacturing. The heating element, glass and resins should not be chemically reactive with each other at the conditions of operation to ensure that detrimental chemical compounds (that will decrease the efficiency and life of the mould) are not formed in the mould. One of the important physical properties of the components of the mould is thermal expansion. Normally the thermal expansion of these components, especially that of heating element and glass composition are very different from each other and the differential expansion of these components during cyclic heating can bring about cracks in the mould body and reduce its useful lifetime. Hence it is important to match the thermal expansion of the heating element network and the glass compositions through either the chemical or structural changes to one or both of these components. Some aspects of present invention are directed at these.

Another aspect of the present invention is to provide a mould 10 (FIG. 1) and a method of fabrication of the same by providing a support structure 12 having a predefined shape; applying the support structure with a heat distribution layer 42; applying at least one carbon heating network layer 16; applying at least one glass network layer 18 upon the at least one carbon network layer 16; applying a resin 22 to each of said at least one carbon network layer 16 and the at least one glass network layer 18; and integrating the heat distribution layer 42, carbon network layer 16, glass network layer 18 and the resin 22 to form a mould unit 10. In one particular embodiment the carbon heating element network 16 is used in the knitted fabric form and the knitted carbon heating element network 16 is joined to the electrical power supply 44 through welded or brazed metal or alloy wires 46. Optionally a heat dissipating, surface insulation layer 20 can be added to the outer surface of the mould 10 in order to reflect the heat back into the mould 10.

Carbon can be produced in a wide range of electrical conductivity. Carbon also has excellent mechanical properties allowing it to be used in varying thicknesses and length for varying resistivity applications. The carbon material for use in this embodiment of the invention is not limited in molecular structure, and may be, for example, a graphitic carbon, an amorphous carbon or a carbon with an intermediate crystalline structure between graphitic carbon and amorphous carbon.

The carbon in the graphite form has a very anisotropic thermal expansion. On heating from room temperature, there is an expansion in the c-direction of its hexagonal crystal structure and a contraction in the basal plane direction. Most of the carbon fibers in general exhibit preferred orientation of the basal planes and therefore will be oriented in its c-axis in the transverse direction. Hence the thermal expansion in the transverse direction for the carbon fibers having graphite form will be more compared to that in the axial direction. This property of the carbon makes the surroundings of the carbon heating element networks to experience an extremely anisotropic thermal expansion. The structural modification for the carbon heating element network to reduce its thermal expansion anisotropy is hence desirable.

The carbon material for use in the present invention is not limited in shape and may be, for example, in the form of a carbon fiber, carbon fiber cloth, a braided carbon, or a knitted carbon network. These carbon networks may be used either singly or in combination. These combinations can also be used to provide differential heating at different parts of the mould. The carbon heating elements can optionally have a cover to prevent the oxidation changes of carbon or to provide the physical robustness to the carbon heating element network 16. The fiber diameter of the carbon for use in this invention is not limited as long as the contemplated heating result can be achieved. However in one embodiment, the diameters of the carbon fibers are from about 3 µm to about 9 µm.

One embodiment of the present invention is to provide the heating element network 16 in the form of a collection of fibers. The fibers, while maintaining their interconnectivity, can be dispersed in the glass composition so that the individual thermal expansion of the fibers is accommodated by the surrounding glass composition, thereby experiencing a combined, large thermal expansion difference.

Figure 3:
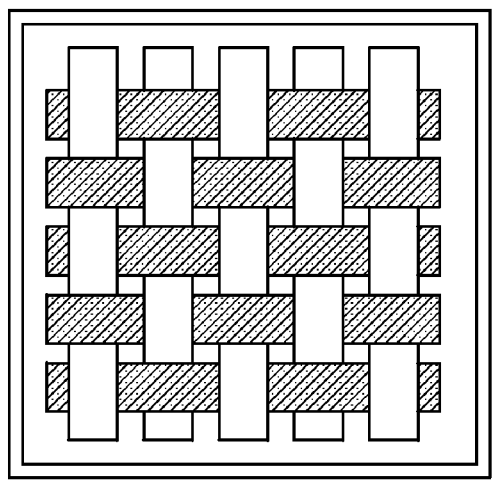
FIG. 3 is an example of a woven network.

One embodiment of the present invention is to provide a heating element network 16 in the form of a woven fabric. The weaving can be in two dimensions (2-D) or three dimensions (3-D). FIG. 3 shows an example of a simple, 2-D woven fabric. A 2-D woven fabric shows good in-plane properties. Such 2-D woven fabrics are easy to prepare, as highly automated preform fabrication methods are available. Additionally, such 2-D woven fabrics provide good drapability thereby overcoming the rigidity of layer conformation during formation of the mould structure. Woven fabrics are also suited for large area coverage and hence particularly suited for the heating elements of the rotor blade moulds as the moulds are generally large in size and can be of the lengths of up to about 50-60 meters and up to about 3-4 meters wide. 3-D woven fabrics can be formed in limited woven shapes and show reasonable in-plane and out-of plane properties. This is particularly useful where the 3-D physical properties such as 3-D stretchability, and thermal expansion are important. Disposing heating elements in the form of a woven fabric provides room for expansion of the heating elements 16 thereby limiting the effect on the glass composition 18. In one embodiment the woven fabric is disposed in an undulated form. The undulation decreases the stiffness of the fabric and makes it more accommodative for the mechanical and thermal expansion changes that happen in the mould.

Figure 4:
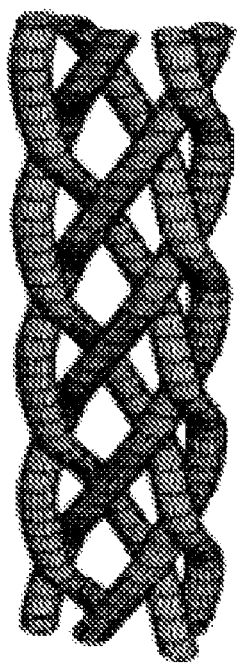
FIG. 4 is an example of a braided network.

Another embodiment of the present invention is a heating element network 16 in a braided form. In a braided form the interlacing of the individual yarns are normally at angles other than 0° and 90°. At any one time part of the yarns travel in the positive direction while the others travel in the negative direction as shown in FIG. 4. For a braid angle of ±45°, interlacing is half of that for the plain weave, which means reduced crimp and better yarn to composite translational strength. The structure of braided fabrics makes them highly deformable in the axial and radial directions. The rib structure of the braids in general possesses an unusually high degree of elasticity and is particularly suitable to accommodate the thermal expansion of the heating elements. In one embodiment the braided form of the heating element network 16 comprises some undulated parts.

Figure 5:
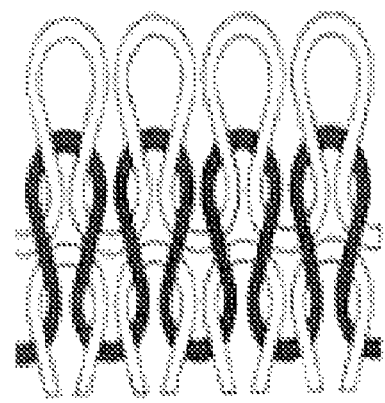
FIG. 5 is an example of a knitted network.

Yet another embodiment of the present invention is a heating element network 16 in a knitted form (FIG. 5). The advantage of knitted fabric is that it has stretchability, which is an important consideration where accommodation of thermal expansion is concerned. Also the knit fabric is tougher and better able to withstand structural wear. The knitted fabric can be in either weft type or warp type and can also be in a 2-D knitted form or a 3-D knitted form. FIG. 5 shows an example of a simple, 2-D weft knitted fabric. The heating elements 16 with the knitted form are able to apply heat uniformly to any requirement and even more accommodative of the thermal expansion than the woven or braided form.

The mould unit 10 (FIG. 2), once formed can be subsequently used for making a wind rotor blade or its parts (or other products). The inner smooth surface 40 of the mould will receive the blade compositions at the time of casting the blades on the mould. The heating element network 16 is primarily required to cure the resultant blade structures after casting in the mould 10. The heating element network 16 is typically connected to an external power supply 44 through the welded or brazed metal or alloy wires 46. The heating element network 16, with the help of the heat-distribution layer, is generally able to provide a controlled and distributed heat output as required for the optimum curing and post curing of moulded objects such as blades during manufacturing.

The mould unit 10, portrayed in the earlier paragraphs is described as a structure with a uniform inner surface for the purpose of illustration only. Depending on the structure of the blades or blade parts cast using the mould 10, the inner surface 40 of the mould can have the features like ribs, beams, spikes etc, which can be integrated into the mould structure either during the build-up of the mould itself or by joining after the initial mould formation.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A method of fabricating a mould comprising:
   providing a support structure having a predefined shape;
   applying a heat distribution layer directly on the support structure;
   applying a heating element network upon the heat distribution layer;
   applying at least one glass composition layer upon said heating element network;
   applying a resin composition to each of said heating element network and said at least one glass composition layer;
   integrating said heat distribution layer, heating element network, said at least one glass composition layer, and said resin composition to form a mould unit; and
   detaching the mould unit from the support structure.

2. The method of claim 1, wherein the heat distribution layer comprises a glass fabric layer.

3. The method of claim 1, wherein the said heating element network comprises carbon.

4. The method of claim 1, wherein the support structure comprises a mould plug.

5. The method of claim 1, wherein the heating element network comprises fibers.

6. The method of claim 1, wherein the heating element network comprises a drapable fabric.

7. The method of claim 1, wherein the heating element network comprises a braided network.

8. The method of claim 1, wherein the heating element network comprises a knitted network.

9. The method of claim 1, wherein the at least one glass composition layer comprises fibers.

10. The method of claim 1, wherein the at least one glass composition layer comprises a drapable fabric.

11. The method of claim 1, wherein the at least one glass composition layer comprises a braided network.

12. The method of claim 1, wherein the resin composition infiltrates through the heating element network and glass composition layer.

13. A method of fabricating a mould comprising:
   providing a support structure having a predefined shape;
   applying a heat distribution layer directly on the support structure;
   applying at least one carbon network layer on the heat distribution layer;
   applying at least one glass network layer upon said at least one carbon network layer;
   applying a resin to each of said at least one carbon network layer and said at least one glass network layer;
   integrating said heat distribution layer, carbon network layer, glass network layer, and said resin to form a mould unit; and
   detaching the mould unit from the support structure.

14. The method of claim 13, wherein the carbon network comprises carbon fabric.

15. The method of claim 13, wherein the carbon network comprises braided form of carbon.

16. The method of claim 13, wherein the carbon network comprises knitted form of carbon.

17. The method of claim 13, wherein the carbon network comprises an undulation.

18. The method of claim 13, wherein the glass network comprises a fabric form.

19. The method of claim 13, wherein the glass network comprises a braided form.

20. A method of fabricating a mould comprising:
   providing a support structure having a predefined shape;
   applying a heating element network upon the support structure;
   applying at least one glass composition layer upon said heating element network;
   applying a resin composition to each of said heating element network and said at least one glass composition layer;
   integrating said heating element network, said at least one glass composition layer, and said resin composition to form a mould unit;
   releasing the mould unit from the support structure; and
   applying a heat distribution layer to the mould unit surface after releasing the mould unit from the support structure.

21. The method of claim 20, wherein the heat distribution layer is applied in the form of glass painting.

* * * * *